(12) United States Patent
Chiu

(10) Patent No.: US 9,719,764 B2
(45) Date of Patent: Aug. 1, 2017

(54) RATIO TAPE MEASURE

(71) Applicant: Yung-Peng Chiu, Taichung (TW)

(72) Inventor: Yung-Peng Chiu, Taichung (TW)

( * ) Notice: Subject to any disclaimer, the term of this patent is extended or adjusted under 35 U.S.C. 154(b) by 136 days.

(21) Appl. No.: 14/845,974

(22) Filed: Sep. 4, 2015

(65) Prior Publication Data

US 2016/0076866 A1 Mar. 17, 2016

(30) Foreign Application Priority Data

Sep. 12, 2014 (TW) .............................. 103216229 U

(51) Int. Cl.
*G01B 3/10* (2006.01)

(52) U.S. Cl.
CPC ......... *G01B 3/1041* (2013.01); *G01B 3/1084* (2013.01); *G01B 2003/1051* (2013.01)

(58) Field of Classification Search
CPC ...... G01B 3/10; G01B 3/1041; G01B 3/1084; G01B 2003/1051
USPC .......................................... 33/760, 764, 769
See application file for complete search history.

(56) References Cited

U.S. PATENT DOCUMENTS

| | | | |
|---|---|---|---|
| 870,884 A * | 11/1907 | Holinger ................... | G06G 1/00 33/764 |
| 6,276,069 B1 * | 8/2001 | Chadwick ................ | A41H 1/02 33/764 |
| 7,331,116 B1 * | 2/2008 | Johnston .................. | B44D 3/38 33/414 |
| 2005/0155245 A1 * | 7/2005 | Panosian .............. | G01B 3/1084 33/760 |
| 2005/0223582 A1 * | 10/2005 | Baugh .................. | G01B 3/1041 33/764 |
| 2008/0092402 A1 * | 4/2008 | Ye ......................... | G01B 3/1084 33/764 |
| 2016/0076866 A1 * | 3/2016 | Chiu ..................... | G01B 3/1084 33/764 |

* cited by examiner

*Primary Examiner* — Yaritza Guadalupe-McCall
(74) *Attorney, Agent, or Firm* — Alan D. Kamrath; Kamrath IP Lawfirm, P.A.

(57) ABSTRACT

A ratio tape measure has a case, a reeling unit, a ratio wheel unit, a decurling wheel, and a tape measure unit. The case has a reeling shaft, a ratio shaft, and a decurling shaft. The ratio wheel unit has a first perimeter wheel mounted around the ratio shaft and a second perimeter wheel mounted around the ratio shaft. The decurling wheel is rotatably mounted around the decurling shaft. The tape measure unit is wound around the reeling unit and the ratio wheel unit and has a first tape and a second tape. When the first perimeter wheel and the second perimeter wheel rotate, the first tape and the second tape can be pulled out at a fixed ratio, and a user can measure two lengths at one time.

20 Claims, 5 Drawing Sheets

RATIO TAPE MEASURE

BACKGROUND OF THE INVENTION

1. Field of the Invention

The present invention relates to a tape measure, and more particularly to a ratio tape measure that can do the measuring at a fixed ratio.

2. Description of Related Art

In the field of architecture or interior design, a conventional tape measure is used to measure the size of room space or all kinds of furniture, and users can plan the spatial design to meet proper proportions by the measurement of the conventional tape measure.

The conventional tape measure only has a single-channel tape, so the user can only measure one length at one time. A surface of the conventional tape measure is marked with scales of centimeters or inches, feet, etc. Even symbols of good or bad luck in Chinese custom are marked on the surface of the conventional tape measure, so traditional concept of good or bad feng shui is also considered when measuring and planning the spatial design.

However, the conventional tape measure can only measure one length at one time, and cannot measure or record two lengths at the same time. In addition, the conventional tape measure cannot measure lengths at a specific ratio at one time. Therefore, the conventional tape measure is inconvenient and time-consuming in use.

Furthermore, architecture or interior design pursues balance and visual beauty, so the golden ratio (1:1.618) is often the ratio of principle in planning. Therefore, the users have to constantly measure and calculate a ratio, and the conventional tape measure is inconvenient in use. So the conventional tape measure should be improved.

To overcome the shortcomings of the conventional tape measure, the present invention provides a ratio tape measure to mitigate or obviate the aforementioned problems.

SUMMARY OF THE INVENTION

The main objective of the present invention is to provide a ratio tape measure which can do the measuring at a fixed ratio The ratio tape measure has a case, a reeling unit, a ratio wheel unit, a decurling wheel, and a tape measure unit. The case has a reeling shaft, a ratio shaft, and a decurling shaft. The ratio wheel unit has a first perimeter wheel mounted around the ratio shaft and a second perimeter wheel mounted around the ratio shaft. The decurling wheel is rotatably mounted around the decurling shaft. The tape measure unit is wound around the reeling unit and the ratio wheel unit and has a first tape and a second tape. When the first perimeter wheel and the second perimeter wheel rotate, the first tape and the second tape can be pulled out of the case at a fixed ratio, and a user can measure two lengths at one time.

Other objects, advantages, and novel features of the invention will become more apparent from the following detailed description when taken in conjunction with the accompanying drawing.

DETAILED DESCRIPTION OF PREFERRED EMBODIMENT

Figure 1:
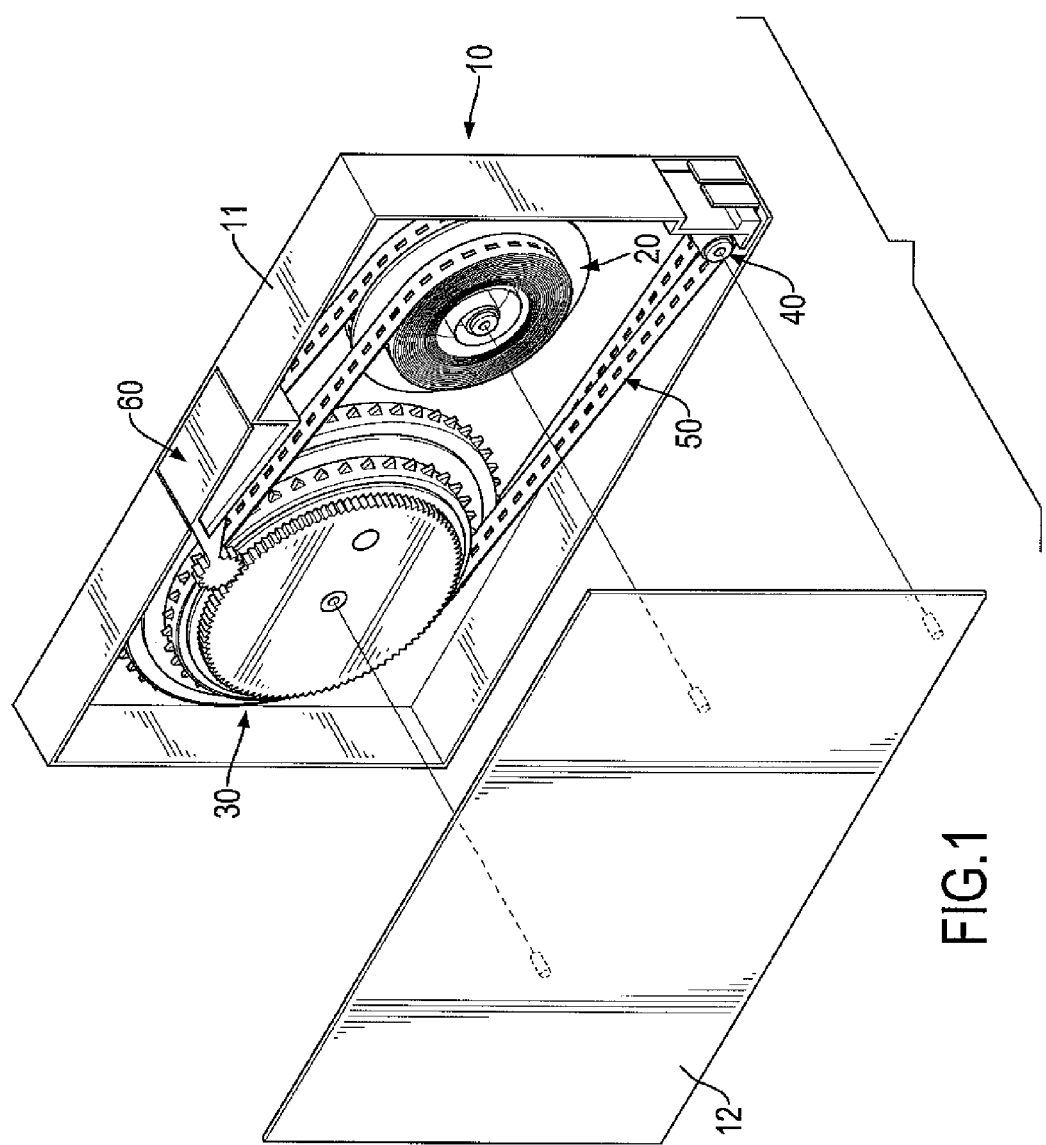
FIG. 1 is an exploded perspective view of a ratio tape measure in accordance with the present invention.
Figure 2:
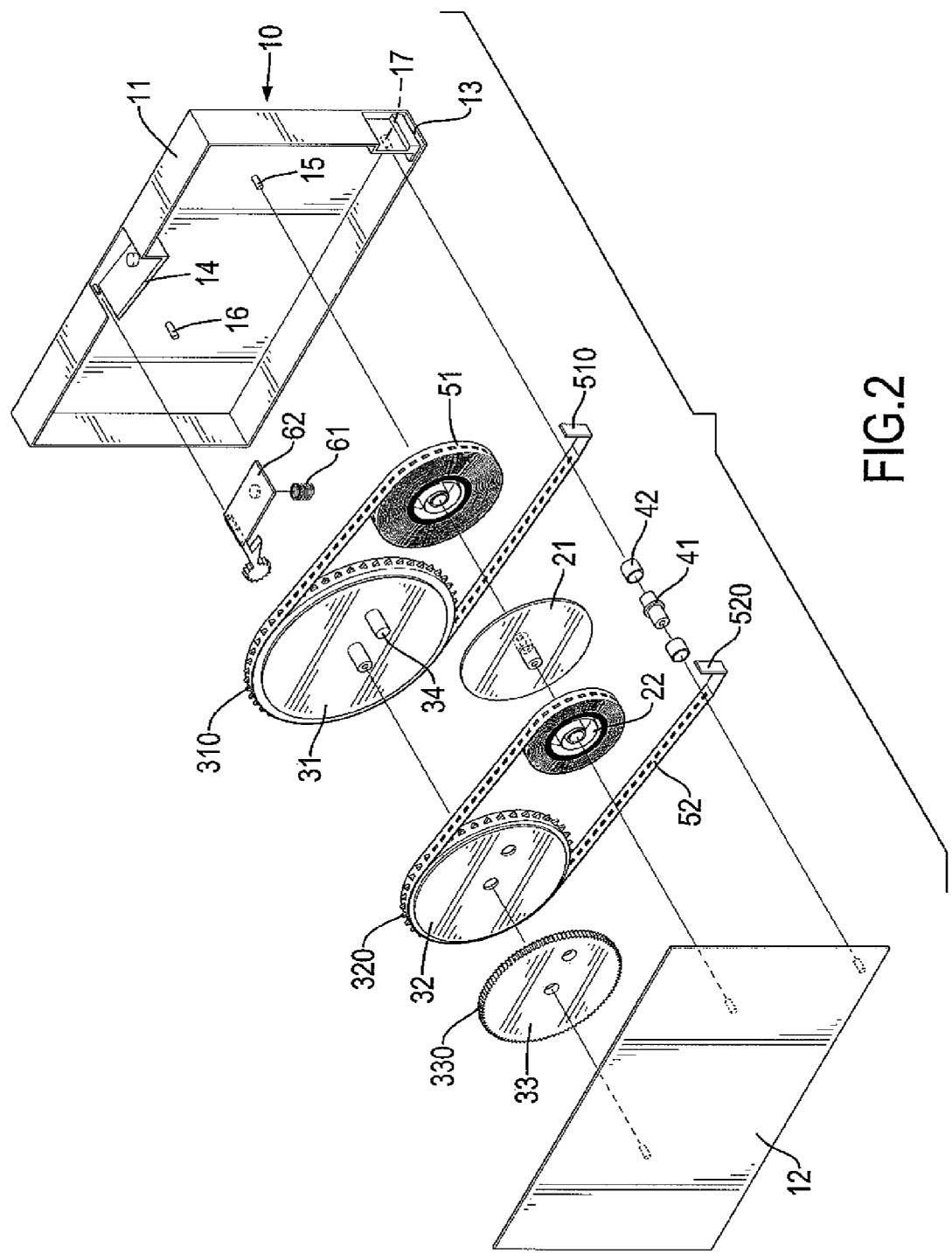
FIG. 2 is a further exploded perspective view of the ratio tape measure in FIG. 1.

With reference to FIGS. 1 to 4, a ratio tape measure in accordance with the present invention comprises a case 10, a reeling unit 20, a ratio wheel unit 30, a decurling wheel 40, a tape measure unit 50, and a positioning unit 60.

The case 10 is a rectangular and hollow casing, and has a bottom case 11 and a side cover 12. The bottom case 11 has an interior, a side surface, an opening, an inner surface, a front side wall, an upper wall, a middle, a tape hole 13, an installing base 14, a reeling shaft 15, a ratio shaft 16, and a decurling shaft 17. The interior of the bottom case 11 is hollow, and the opening is formed through the side surface of the bottom case 11 and communicates with the interior of the bottom case 11. The tape hole 13 is formed through a bottom of the front side wall of the bottom case 11 and communicates with the interior of the bottom case 11. The installing base 14 is L-shaped and is formed on the upper wall of the bottom case 11.

The reeling shaft 15, the ratio shaft 16, and the decurling shaft 17 protrude from the inner surface of the bottom case 11 toward the opening of the bottom case 11. The reeling shaft 15 and the ratio shaft 16 are disposed in the middle of the bottom case 11 and corresponding in position to each other. The decurling shaft 17 is disposed on the bottom case 11 and adjacent to the tape hole 13. The side cover 12 is mounted on the opening of the bottom case 11. The present invention does not limit combinational directions of the case 10; that is, the case 10, the bottom case 11 and the side cover 12 may be combined in a left-and-right direction, an up-and-down direction, or a front-and-back direction.

The reeling unit 20 is mounted in the case 10, is mounted around the reeling shaft 15, and has a separating disk 21 and two volute springs 22. The separating disk 21 has a center and a mounting pipe. The mounting pipe of the separating disk 21 is formed on and protrudes from the center of the separating disk 21, and is mounted around and fixed on the reeling shaft 15 to enable the separating disk 21 to rotate relative to the case 10. The mounting pipe has two mounting ends, the two mounting ends respectively extend out of two sides of the separating disk 21, and one of the mounting ends is mounted around and fixed on the reeling shaft 15. The two volute springs 22 are respectively mounted around the two mounting ends of the mounting pipe and beside the two sides of the separating disk 21. Each one of the two volute springs 22 has an inner end, and the inner end of each one of the volute springs 22 is mounted around and fixed on the mounting pipe of the separating disk 21.

The ratio wheel unit 30 is mounted in the case 10, and is rotatably mounted around the ratio shaft 16. The ratio wheel unit 30 has a first perimeter wheel 31, a second perimeter wheel 32, a positioning wheel 33, and a synchronizing pin 34. The first perimeter wheel 31 has a center and a connecting tube. The connecting tube of the first perimeter wheel 31 is formed on and protrudes from the center of the first perimeter wheel 31, is mounted around the ratio shaft 16, and has two connecting ends. One of the two connecting ends of the connecting tube is mounted around the ratio shaft 16, and the other connecting end faces the side cover 12. The first perimeter wheel 31 is aligned with one of the volute springs 22 that is mounted around the reeling shaft 15. The second perimeter wheel 32 is mounted around the connecting end that is mounted around the ratio shaft 16 of the connecting tube of the first perimeter wheel 31. The second perimeter wheel 32 is aligned with the other volute spring 22. The second perimeter wheel 32 has a diameter smaller than a diameter of the first perimeter wheel 31. A ratio of a perimeter of the second perimeter wheel 32 to a perimeter of the first perimeter wheel 31 is the golden ratio (1:1.618). The positioning wheel 33 is mounted on the connecting end which faces the side cover 12 of the connecting tube of the first perimeter wheel 31, is between the second perimeter wheel 32 and the side cover 12, and has a surrounding surface and multiple positioning teeth 330. The multiple positioning teeth 330 are formed on the surrounding surface of the positioning wheel 33.

The synchronizing pin 34 is formed on an eccentric position on the first perimeter wheel 31, is mounted through the second perimeter wheel 32 and the positioning wheel 33, and this makes the first perimeter wheel 31, the second perimeter wheel 32, and the positioning wheel 33 rotate synchronously. Preferably, the first perimeter wheel 31 and the second perimeter wheel 32 are not limited to either two elements detachably combined together or one integrated form. The first perimeter wheel 31 has a surrounding surface and multiple anti-slipping teeth 310, and the multiple anti-slipping teeth 310 are formed on and protrude from the surrounding surface of the first perimeter wheel 31 at spaced intervals. The second perimeter wheel 32 has a surrounding surface and multiple anti-slipping teeth 320, and the multiple anti-slipping teeth 320 are formed on and protrude from the surrounding surface of the second perimeter wheel 32 at spaced intervals.

The decurling wheel 40 is mounted in the case 10, and is rotatably mounted around the decurling shaft 17. Preferably, the decurling wheel 40 has a decurling sleeve 41 and two anti-slipping collars 42. The decurling sleeve 41 is rotatably mounted around the decurling shaft 17 and has two ends, one of the two ends faces the inner surface of the bottom case 11. The two anti-slipping collars 42 are ring-shaped and are mounted around the two ends of the decurling sleeve 41 respectively.

The tape measure unit 50 is wound around the reeling unit 20 and the ratio wheel unit 30, and extends out of the tape hole 13 of the case 10 after being decurled by the decurling wheel 40. The tape measure unit 50 has a first tape 51 and a second tape 52.

The first tape 51 has an inner end and an outer end. The inner end of the first tape 51 is fixed on the volute spring 22 that is mounted around the reeling shaft 15 and is releasably wound around the volute spring 22. The outer end of the first tape 51 is wound around the surrounding surface of the first perimeter wheel 31, and then the outer end of the first tape 51 extends out of the tape hole 13 via one of the anti-slipping collars 42 of the decurling wheel 40. The second tape 52 has an inner end and an outer end. The inner end of the second tape 52 is fixed on the other volute spring 22 that is mounted between the side cover 12 and the separating disk 21 and is releasably wound around the volute spring 22. The outer end of the second tape 52 is wound around the surrounding surface of the second perimeter wheel 32, and then the outer end of the second tape 52 extends out of the tape hole 13 via the other anti-slipping collar 42 of the decurling wheel 40.

Preferably, the first tape 51 has a stopping tab 510, and the stopping tab 510 is formed at the outer end of the first tape 51 and extends out of the tape hole 13. The second tape 52 has a stopping tab 520, and the stopping tab 520 is formed at the outer end of the second tape 52 and extends out of the tape hole 13. The stopping tabs 510, 520 can respectively keep the outer end of the first tape 51 and the outer end of the second tape 52 limited by the case 10 at the tape hole 13.

Preferably, the first tape 51 has multiple anti-slipping holes 511, the anti-slipping holes 511 are formed through the first tape 51 at spaced intervals, and are respectively engaged with the anti-slipping teeth 310 of the first perimeter wheel 31. The second tape 52 has multiple anti-slipping holes 521, the anti-slipping holes 521 are formed through the second tape 52 at spaced intervals, and are respectively engage with the anti-slipping teeth 320 of the second perimeter wheel 32. Thereby the first tape 51 and the second tape 52 would not slip respectively relative to the first perimeter wheel 31 and the second perimeter wheel 32 when the first tape 51 and second tape are being pulled out or retracted, and the golden ratio of the first tape 51 and the second tape 52 remain intact due to the non-slipping of the first tape 51 and the second tape 52.

The positioning unit 60 is mounted on the installing base 14 of the case 10 and detachably engages with the positioning wheel 33. The positioning unit 60 has an elastic element 61 and a pivoting arm 62. The elastic element 61 is fixed on a top surface of the installing base 14. The pivoting arm 62 is pivotally connected to a rod that is formed on and protrudes from the inner surface of the case 10 adjacent to the installing base 14 of the base 10. The pivoting arm 62 has an outer end and an inner end, and the outer end of the pivoting arm 62 extends above the elastic element 61 and selectively presses against the elastic element 61. The inner end of the pivoting arm 62 extends into the case 10 and is beside the positioning wheel 33. Preferably, the pivoting arm 62 has an engaging gear wheel 620. The engaging gear wheel 620 is formed at the inner end of the pivoting arm 62 and engages with the positioning teeth 330 of the positioning wheel 33, thereby the positioning wheel 33, the first perimeter wheel 31, and the second perimeter wheel 32 are stopped rotating by an engagement between the engaging gear wheel 620 of the pivoting arm 62 and the positioning teeth 330 of the positioning wheel 33.

Figure 3:
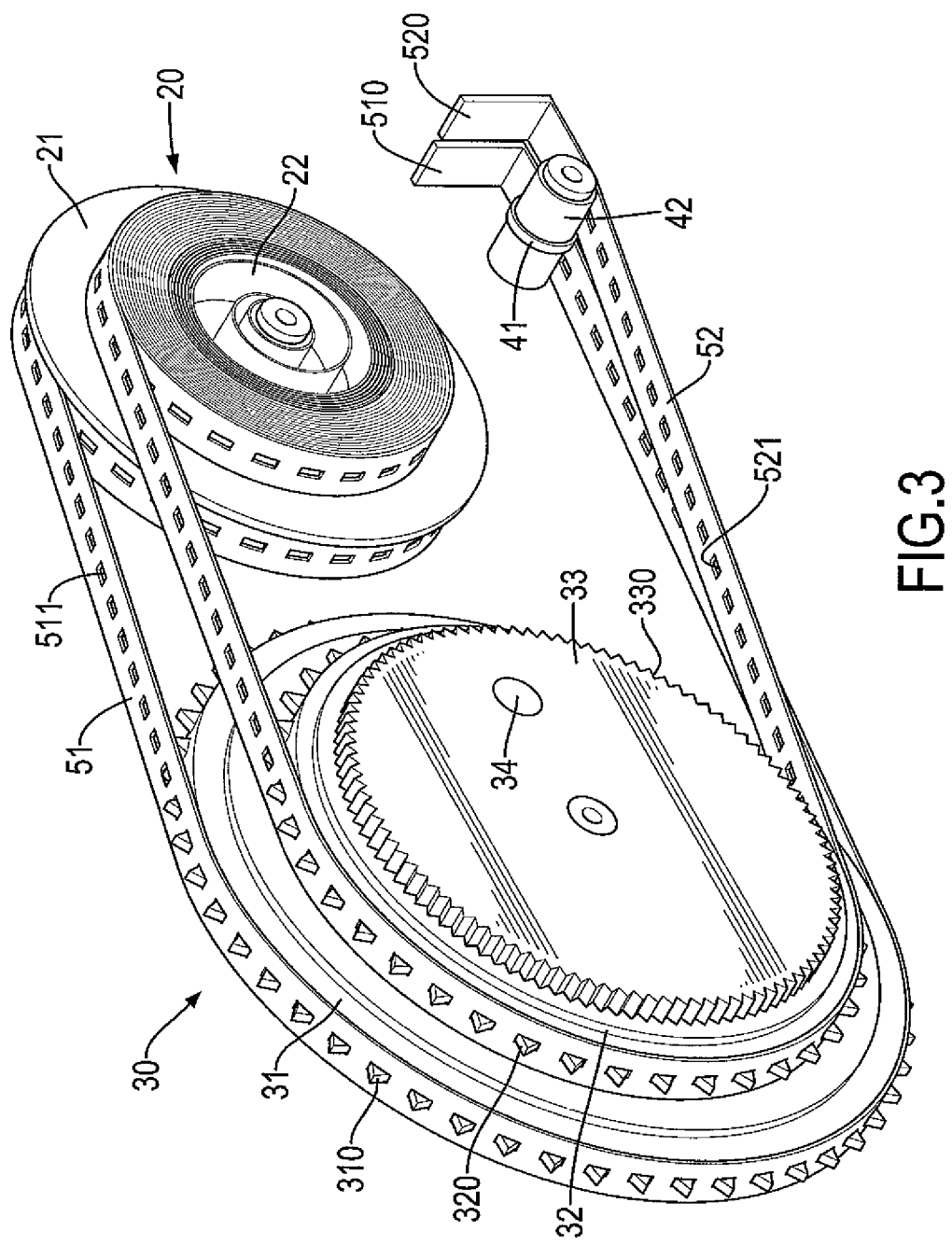
FIG. 3 is an enlarged perspective view of the ratio tape measure in FIG. 1.
Figure 4:
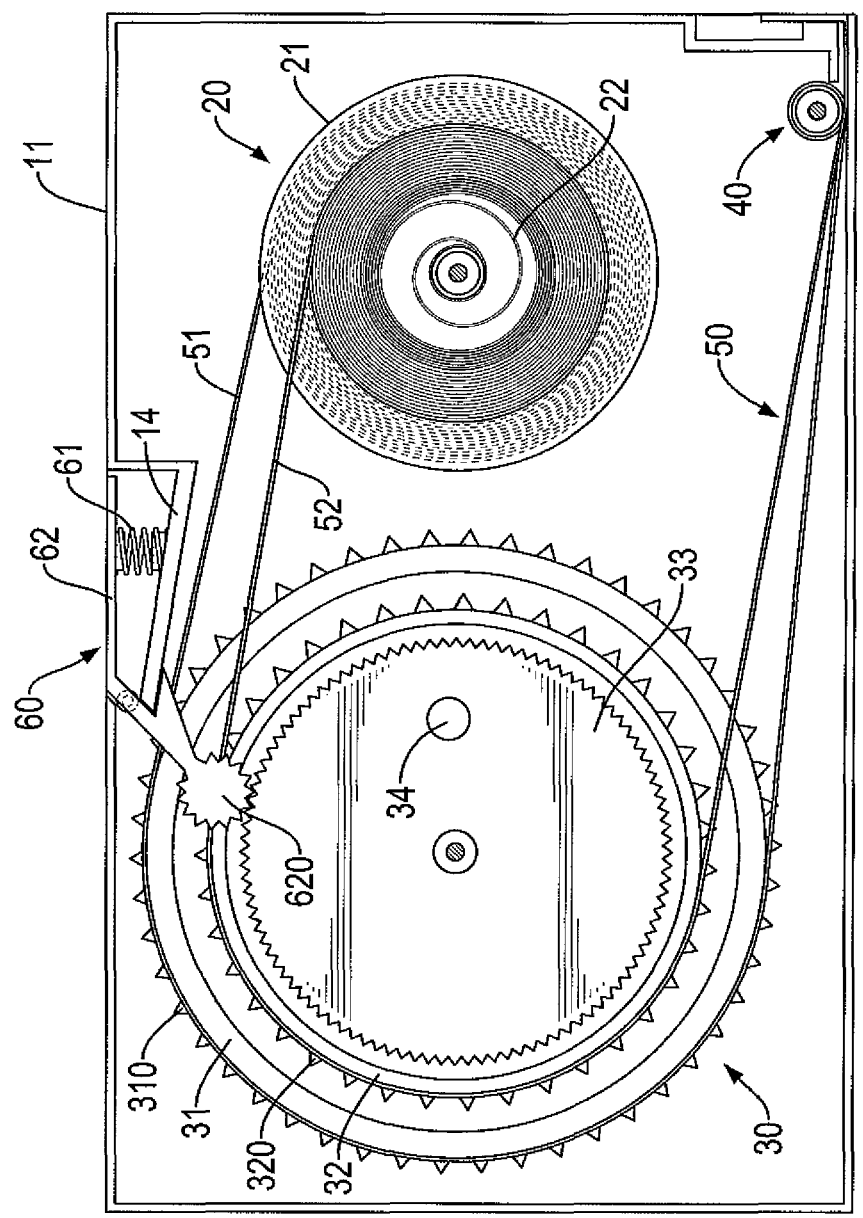
FIG. 4 is an enlarged side view of the ratio tape measure in FIG. 1.
Figure 5:
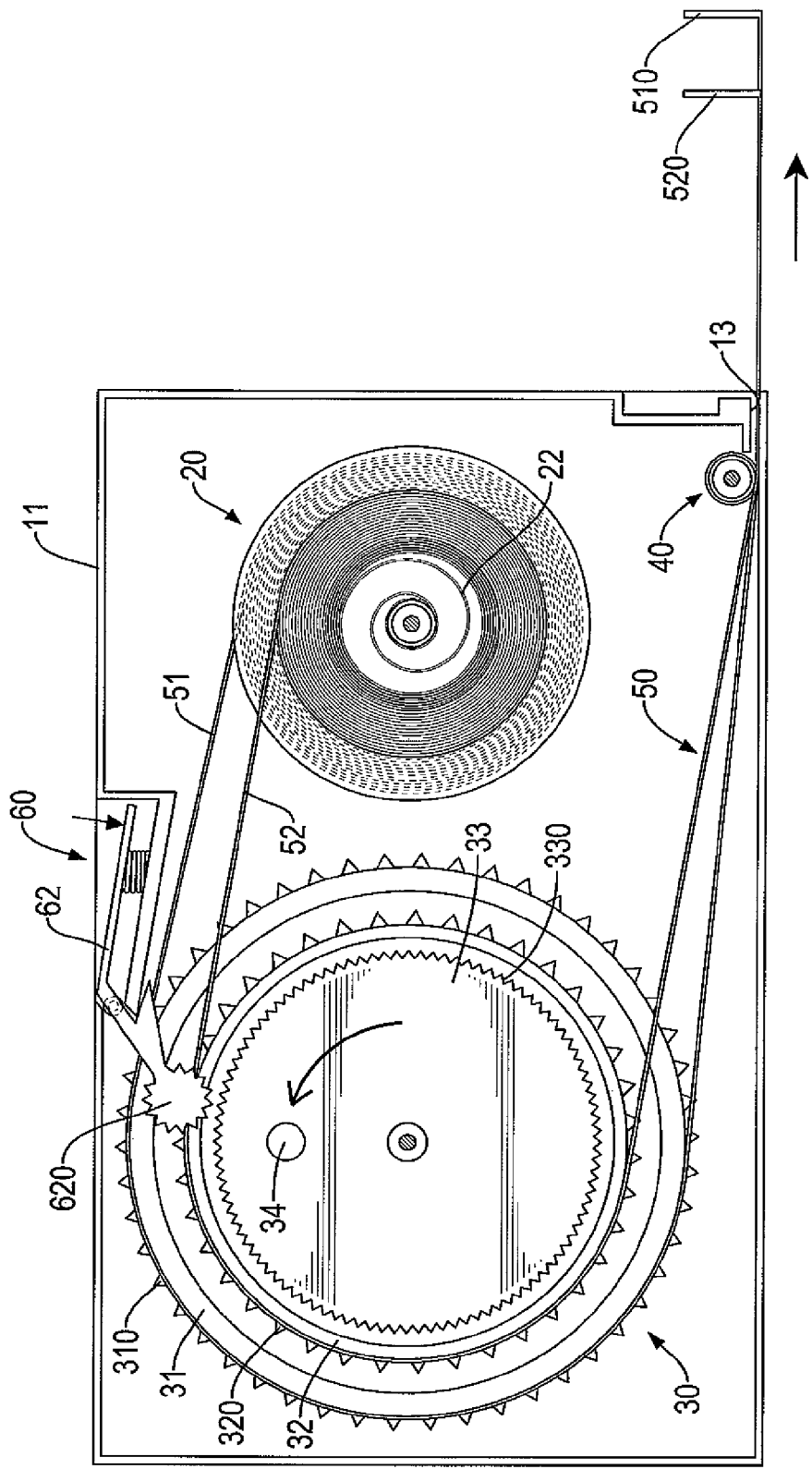
FIG. 5 is an operational side view of the ratio tape measure in FIG. 1.

With reference to FIGS. 4 and 5, when the ratio tape measure is in use, a user's thumb presses the outer end of the pivoting arm 62 of the positioning unit 60, and this makes the engaging gear wheel 620 detach from the positioning teeth 330 of the positioning wheel 33. And the user can easily pull the first tape 51 and the second tape 52 toward outside. With reference to FIG. 3, at the same time, the anti-slipping teeth 310, 320 of the first perimeter wheel 31 and the second perimeter wheel 32 start to rotate by the friction force of the first tape 51 and the second tape 52 and the drag force by the anti-slipping holes 511, 512. And the first tape 51 and the second tape 52 which are wound around the volute springs 22 start to compress the two volute springs 22 after the first tape 51 and the second tape 52 are pulled out of the case 10.

When the tape measure is pulled out to a proper length by the user, the user's thumb releases the outer end of the pivoting arm 62 of the positioning unit 60. The elastic element 61 would push upward the outer end of the pivoting arm 62, and this makes the engaging gear wheel 620 move back to original site and engage with the positioning teeth 330 of the positioning wheel 33. Because the positioning wheel 33, the first perimeter wheel 31, and the second perimeter wheel 32 are limited by the synchronizing pin 34, the first perimeter wheel 31 and the second perimeter wheel 32 cannot rotate. At this time, the pulled out lengths of the first tape 51 and the second tape 52 are maintained at the golden ratio, and thereby can record two lengths at the golden ratio by one time measuring.

When the user finishes the measuring, the user presses the outer end of the pivoting arm 62 again, and this makes the engaging gear wheel 620 of the pivoting arm 62 detach from the positioning teeth 330 of the positioning wheel 33 and release the first tape 51 and the second tape 52 at the same time. At this time, the two compressed volute springs 22 of the reeling unit 20 start to elastically move back to the original site, and reel the first tape 51 and the second tape 52 until the stopping tabs 510, 520 abut the case 10 at the tape hole 13, thereby completing the reeling action of the first tape 51 and the second tape 52.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A ratio tape measure comprising:
a case having
a side wall;
an inner surface;
a tape hole formed through the side wall;
a reeling shaft disposed on the inner surface;
a ratio shaft disposed on the inner surface and corresponding in position to the reeling shaft; and
a decurling shaft disposed on the inner surface and adjacent to the tape hole;
a reeling unit mounted around the reeling shaft and having
a separating disk having
a center; and
a mounting pipe formed on the center of the separating disk and mounted around and fixed on the reeling shaft, and the mounting pipe having two mounting ends, one of the mounting ends mounted around and fixed on the reeling shaft; and
two volute springs respectively mounted around the two mounting ends and beside two sides of the separating disk, each one of the two volute springs having an inner end, and the inner end of each one of the volute springs mounted around and fixed on the mounting pipe of the separating disk;
a ratio wheel unit having
a first perimeter wheel mounted around the ratio shaft and having a surrounding surface; and
a second perimeter wheel mounted around the ratio shaft and having a surrounding surface and a diameter smaller than a diameter of the first perimeter wheel, and the first perimeter wheel and the second perimeter wheel rotating synchronously and mounted on the two volute springs respectively;
a decurling wheel rotatably mounted around the decurling shaft; and
a tape measure unit wound around the reeling unit and the ratio wheel unit and having
a first tape having
an inner end fixed on one of the volute springs that is mounted around the reeling shaft and releasably wound around the volute spring; and
an outer end wound around the surrounding surface of the first perimeter wheel, and the outer end of the first tape extending out of the tape hole via the decurling wheel; and
a second tape having
an inner end fixed on the other volute spring and releasably wound around the volute spring; and
an outer end wound around the surrounding surface of the second perimeter wheel, and the outer end of the second tape extending out of the tape hole via the decurling wheel.

2. The ratio tape measure as claimed in claim 1, wherein
the first perimeter wheel has
multiple anti-slipping teeth formed on and protruding from the surrounding surface of the first perimeter wheel at spaced intervals;
the second perimeter wheel has
multiple anti-slipping teeth formed on and protruding from the surrounding surface of the second perimeter wheel at spaced intervals;
the first tape has
multiple anti-slipping holes formed through the first tape at spaced intervals, the multiple anti-slipping holes engaged with the anti-slipping teeth of the first perimeter wheel; and
the second tape has
multiple anti-slipping holes formed through the second tape at spaced intervals, the multiple anti-slipping holes engaged with the anti-slipping teeth of the second perimeter wheel.

3. The ratio tape measure as claimed in claim 2, wherein
the first tape has
a stopping tab formed at the outer end of the first tape, the stopping tab of the first tape keeping the outer end of the first tape limited by the case at the tape hole; and
the second tape has
a stopping tab formed at the outer end of the second tape, the stopping tab of the second tape keeping the outer end of the second tape limited by the case at the tape hole.

4. The ratio tape measure as claimed in claim 3, wherein
the ratio wheel unit has
a positioning wheel mounted around the ratio shaft, the positioning wheel synchronously rotating with the first perimeter wheel and the second perimeter wheel;
the case has an installing base formed on the side wall of the case; and
the ratio tape measure has a positioning unit mounted on the installing base and detachably engaging with the positioning wheel.

5. The ratio tape measure as claimed in claim 4, wherein
the positioning wheel has
a surrounding surface; and
multiple positioning teeth formed on the surrounding surface of the positioning wheel; and
the positioning unit has
an elastic element fixed on a top surface of the installing base; and
a pivoting arm pivotally connected to an outer surface of the installing base of the base, the pivoting arm having
an outer end extending above the elastic element and selectively pressing against the elastic element; and an inner end extending into the case and being beside the positioning wheel, wherein the pivoting arm has an engaging gear wheel formed at the inner end of the pivoting arm and engaging with the positioning teeth of the positioning wheel.

6. The ratio tape measure as claimed in claim 4, wherein the first perimeter wheel, the second perimeter wheel, and the positioning wheel are fixed by an eccentric synchronizing pin.

7. The ratio tape measure as claimed in claim 3, wherein a ratio of a perimeter of the second perimeter wheel to a perimeter of the first perimeter wheel is the golden ratio (1:1.618).

8. The ratio tape measure as claimed in claim 3, wherein the first perimeter wheel and the second perimeter wheel are fixed by an eccentric synchronizing pin.

9. The ratio tape measure as claimed in claim 2, wherein the ratio wheel unit has
    a positioning wheel mounted around the ratio shaft, the positioning wheel synchronously rotating with the first perimeter wheel and the second perimeter wheel;
the case has an installing base formed on the side wall of the case; and
the ratio tape measure has a positioning unit mounted on the installing base and detachably engaging with the positioning wheel.

10. The ratio tape measure as claimed in claim 9, wherein the positioning wheel has
    a surrounding surface; and
        multiple positioning teeth formed on the surrounding surface of the positioning wheel; and
    the positioning unit has
        an elastic element fixed on a top surface of the installing base; and
            a pivoting arm pivotally connected to an outer surface of the installing base of the base, the pivoting arm having
                an outer end extending above the elastic element and selectively pressing against the elastic element; and
                an inner end extending into the case and being beside the positioning wheel, wherein the pivoting arm has an engaging gear wheel formed at the inner end of the pivoting arm and engaging with the positioning teeth of the positioning wheel.

11. The ratio tape measure as claimed in claim 9, wherein the first perimeter wheel, the second perimeter wheel, and the positioning wheel are fixed by an eccentric synchronizing pin.

12. The ratio tape measure as claimed in claim 2, wherein a ratio of a perimeter of the second perimeter wheel to a perimeter of the first perimeter wheel is the golden ratio (1:1.618).

13. The ratio tape measure as claimed in claim 2, wherein the first perimeter wheel and the second perimeter wheel are fixed by an eccentric synchronizing pin.

14. The ratio tape measure as claimed in claim 1, wherein the ratio wheel unit has
    a positioning wheel mounted around the ratio shaft, the positioning wheel synchronously rotating with the first perimeter wheel and the second perimeter wheel;
the case has an installing base formed on the side wall of the case; and
the ratio tape measure has a positioning unit mounted on the installing base and detachably engaging with the positioning wheel.

15. The ratio tape measure as claimed in claim 14, wherein
    the positioning wheel has
        a surrounding surface; and
            multiple positioning teeth formed on the surrounding surface of the positioning wheel; and
    the positioning unit has
        an elastic element fixed on a top surface of the installing base; and
            a pivoting arm pivotally connected to an outer surface of the installing base of the base, the pivoting arm having
                an outer end extending above the elastic element and selectively pressing against the elastic element; and
                an inner end extending into the case and being beside the positioning wheel, wherein the pivoting arm has an engaging gear wheel formed at the inner end of the pivoting arm and engaging with the positioning teeth of the positioning wheel.

16. The ratio tape measure as claimed in claim 14, wherein the first perimeter wheel, the second perimeter wheel, and the positioning wheel are fixed by an eccentric synchronizing pin.

17. The ratio tape measure as claimed in claim 1, wherein a ratio of a perimeter of the second perimeter wheel to a perimeter of the first perimeter wheel is the golden ratio (1:1.618).

18. The ratio tape measure as claimed in claim 1, wherein the first perimeter wheel and the second perimeter wheel are fixed by an eccentric synchronizing pin.

19. The ratio tape measure as claimed in claim 1, wherein the first perimeter wheel and the second perimeter wheel are detachably combined.

20. The ratio tape measure as claimed in claim 1, wherein the first perimeter wheel and the second perimeter wheel are integrated.

* * * * *